(12) United States Patent
van den Berg et al.

(10) Patent No.: US 8,689,201 B2
(45) Date of Patent: Apr. 1, 2014

(54) AUTOMATED DIVERSITY USING RETURN ORIENTED PROGRAMMING

(75) Inventors: Eric van den Berg, Hoboken, NJ (US); Michael W Little, Hillsborough, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 456 days.

(21) Appl. No.: 13/014,788

(22) Filed: Jan. 27, 2011

(65) Prior Publication Data

US 2012/0030758 A1  Feb. 2, 2012

Related U.S. Application Data

(60) Provisional application No. 61/298,901, filed on Jan. 27, 2010.

(51) Int. Cl.
*G06F 9/44* (2006.01)
*G06F 9/45* (2006.01)

(52) U.S. Cl.
USPC .......... 717/159; 717/140; 717/153; 717/162; 717/163

(58) Field of Classification Search
None
See application file for complete search history.

(56) References Cited

U.S. PATENT DOCUMENTS

2009/0313700 A1* 12/2009 Horne .............................. 726/24

OTHER PUBLICATIONS

R. Hund, T. Holz, and F. Freiling. Return-Oriented Rootkits: Bypassing Kernel Code Integrity Protection Mechanisms. In Securit. '09: Proceedings of the 18th USENIX Security Symposium, 2009.*
R. Roemer, E. Buchanan, H. Shacham and S. Savage, "Return-Oriented Programming: Systems, Languages, and Applications", in review, Oct. 2009. Later Published. ACM Transactions on Information and System Security (TISSEC)—Special Issue on Computer and Communications Security, vol. 15 Issue 1, Mar. 2012.*
Hund et al., "Return Oriented Rootkits: Bypassing kernel code integrity protection mechanisms (2009)", published at Proceedings of Usenix Security 2009.*
Roemer et al., "Transactions on Information and System Security (TISSEC)", "In review by ACM, 2009" and later published by ACM Mar. 2012 in , vol. 15 Issue 1.*
R. Roemer, E. Buchanan, H. Shacham and S. Savage, "Return-Oriented Programming: Systems, Languages, and Applications", In review, Oct. 2009.
R. Hund, T. Holz, F.C. Freiling, "Return-Oriented Rootkits: Bypassing Kernel Code Integrity Protection Mechanisms", Proceedings USENIX Security 2009, Aug. 2009.
S. Checkoway, A Feldman, B. Kantor, J.A. Halderman, E.W. Felten and H. Shacham, "Can DREs Provide Long-Lasting Security? The Case of Return-Oriented Programming and the AVC Advantage", Proceedings EVT/WOTE 2009, Aug. 2009.
R. Chinchani, E. van den Berg, "A Fast Static Analysis Approach to Detect Exploit Code Inside Network Flows", Proceedings RAID 2005.

* cited by examiner

*Primary Examiner* — Isaac Tecklu
*Assistant Examiner* — Hossain Morshed
(74) *Attorney, Agent, or Firm* — Philip J. Feig

(57) ABSTRACT

A method of automatically creating functionally and structurally diverse equivalent copies of software executables using return oriented programming for the purpose of passing through a filter and other purposes includes starting with a program and a target runtime environment, creating a return oriented instruction library having a plurality of code fragments which end in a 'return' instruction from the program and chaining fragments together to automatically form diverse equivalent copies of software executables using return oriented programming.

26 Claims, 1 Drawing Sheet

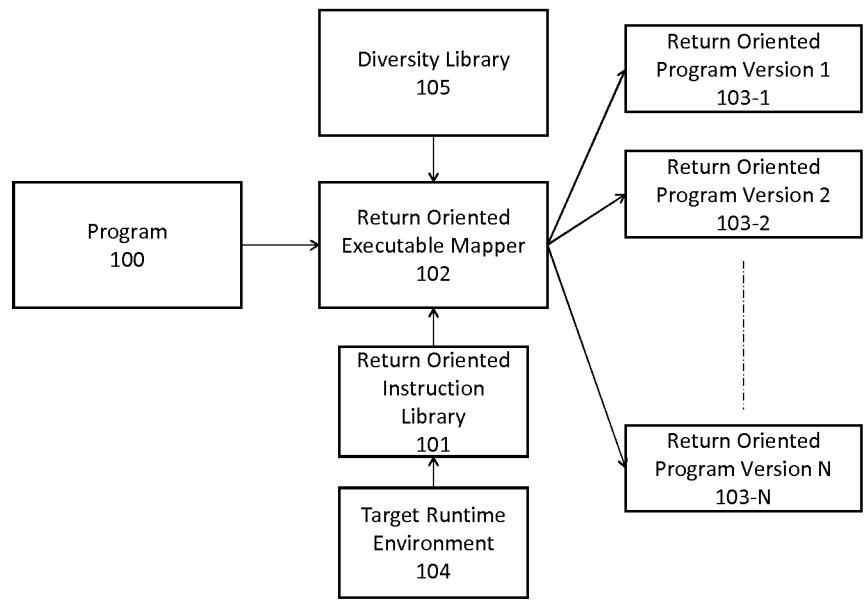

AUTOMATED DIVERSITY USING RETURN ORIENTED PROGRAMMING

CROSS-REFERENCE TO RELATED APPLICATIONS

This application claims the benefit of U.S. Provisional Application No. 61/298,901, filed on Jan. 27, 2010 which is incorporated by reference herein in its entirety.

FIELD OF THE INVENTION

The present invention relates to a method of automatically creating functionally and structurally diverse equivalent copies of software executables using return oriented programming.

BACKGROUND OF THE INVENTION

Preventing execution of malicious code is one of the central problems in computer security. One of the most common defenses to identify and/or filter out unwanted pieces of code is through pattern matching against a large signature base.

Recently a method of attack has been demonstrated, by which an attacker can induce arbitrary behavior in a program whose control flow has been diverted, without injecting any code. In order to accomplish this goal, the attacker executes desired instructions by re-using existing code within the kernel. The pieces of existing code utilized end in return instructions, giving rise to the name 'return-oriented programming' for this set of techniques. Although now the program bytes do not constitute code directly, but jump instructions to pieces of code, it may still be possible to create signatures for the most common pointer byte sequences.

In order to understand the origins of return oriented programming consider an adversary who has discovered a code vulnerability in some application and is looking to exploit it. To achieve the exploit, that is, perform desired actions with the victim application's credentials, the attacker has to accomplish two (separate) tasks: First, the attacker has to subvert the program's control flow. Second, the attacker has to redirect the program's execution to point to the desired code. The first task is often completed, for example, by a buffer-overflow attack which overwrites the return address on the stack. The second task is achieved by inserting code (often also on the stack), and making sure the new return address then points to this code.

A common defense against code insertion attacks is the following: memory is either marked writeable or executable, but not both. This feature, dubbed W-xor-X, is supported in current operating systems such as Windows Vista, Mac OS, Linux and OpenBSD.

While effective in many cases against injected code attacks, W-xor-X is ineffective against attacks which do not rely on both writing and executing code. A new class of attacks based on 'return-oriented-programming', rely on pointers to natively available code snippets to patch together the desired instructions, instead of having to insert the malicious code first. These attacks are related to, and are generalizations of, the older 'return-to-libc' attack.

The 'return-to-libc' attack works as follows: the attacker uses for example a buffer overflow to overwrite the return address on the stack with the address of a legitimate instruction which is located in a library such as the libc runtime library on UNIX style systems. The attacker places the arguments to this function in another place on the stack. This attack can circumvent non-executable stack protections.

Return-oriented programming generalizes this concept by using short sequences of assembly instructions that are followed by a return, which are resident in memory. A program is built by chaining together such sequences, which are called 'gadgets'. Example gadgets compute (AND, XOR, etc.) between two operands. See, for instance, R. Roemer, E. Buchanan, H. Shacham and S. Savage, "Return-Oriented Programming: Systems, Languages, and Applications", In review, October 2009, or R. Hund, T. Holz, F. C. Freiling, "Return-Oriented Rootkits: Bypassing Kernel Code Integrity Protection Mechanisms", Proceedings USENIX Security 2009, August 2009, or S. Checkoway, A. Feldman, B. Kantor, J. A. Halderman, E. W. Felten and H. Shacham, "Can DREs Provide Long-Lasting Security? The Case of Return-Oriented Programming and the AVC Advantage", Proceedings EVT/WOTE 2009, August 2009, which are incorporated herein by reference.

In order to create Return Oriented programs, it is important to have a large collection of candidate instructions or gadgets, i.e. short instruction sequences ending in returns, which are resident in a program's address space. Knowing if a gadget is resident in a program's address space requires (some) knowledge of the target runtime environment. At a minimum, there should be sufficiently varied gadgets to be able to map a given program. It is also preferable to have enough redundancy in the gadget collection to be able to write multiple different return oriented versions of the same agent.

An efficient way of creating a large collection of gadgets is as follows. First, find a sequence of instructions ending in a 'ret'. Since each valid sequence of instructions ending in 'ret' is a gadget, a currently found gadget can be used as a postfix for a potential next gadget, and so build a trie of gadgets. See, for example, Roemer et al.

'Ret' instructions can be found by scanning any given base code in the kernel (e.g. including drivers) for the required word(s). For example, for an x86 architecture computer, the opcode for 'ret' is 0x09. It is also possible to use a number of alternative formulations of 'returns'. See, for example, Roemer et al and Hund et al. For x86 architectures, which have a dense variable length instructions set, a large set of 'ret' instructions can also be found by the following simple method: start at a given offset at random, and start disassembling until a 'ret' is found. Since the disassembly starts at a random offset, it does not have to start at an 'intended' instruction boundary. However, since the instruction set for x86 chips is so dense, disassembly of these random words often gives valid instructions. Any 'ret' thus found is an 'unintended' 'ret' instruction. Nevertheless, such unintended 'ret' instructions can equally well be used in trie construction. If more 'gadgets' need to be found, it is possible to continue the process by simply shifting a byte and repeating the disassembly (a 'derandomized' approach) or starting at a different random offset. See, for example, Hund et al. The applicability of a byte shift to generate more unintended returns is somewhat limited by a self-correcting property of Intel binary disassembly: very quickly, disassembly of the shifted sequence leads to the same sequence of instructions as the original sequence. That is, the two sequences differ only in the first few disassembled instructions, see R. Chinchani, E. van den Berg, "A Fast Static Analysis Approach to Detect Exploit Code Inside Network Flows", Proceedings RAID 2005. As one extreme, it is possible to construct Return Oriented instructions by simply using only the first instruction preceding a found return. This is not very efficient, but does work.

Also, a library of gadgets can equally well be created on RISC-based architectures, e.g. on SPARC machines, but there the instruction set is (short) fixed length, so only intended returns occur.

The basic instructions created above ending in returns, are now patched together to form gadgets for elementary load/store, arithmetic/logic, shift/rotate, and control flow operations. See e.g. Roemer et al and Hund et al.

Having a large collection of instructions and gadgets available, the next step is to build a Mapper. Assume there is already a program available, and it is desired to map/rewrite this program to consist of return oriented instructions/gadgets. One possible method, pursued in e.g. Roemer et al and Hund et al is to write a new, return-oriented compiler, analogous to e.g. a C-compiler, and compile source code with the new return-oriented compiler. This approach is useful when writing new code (as done in exploit generation), or having access to the original source code of a program, provided the new C-compiler is sufficiently rich and complete. For generating code, return oriented shell code is also possible as described in Roemer et al.

SUMMARY OF THE INVENTION

While blocking malicious code is a central problem in computer security and one of the most common defenses to filter out unwanted pieces of code is through pattern matching against a large signature base, sometimes it is desirable or necessary to send code updates or patches through such a filter. The present invention provides a method of automatically creating functionally and structurally diverse equivalent copies of software executables using return oriented programming for the purpose of passing through the filter and other purposes.

The present invention takes a different, more direct approach to return oriented programming than the approaches described above (See Roemer and Hund), which only requires access to executable code, instead of requiring access to source code. The invention uses return-oriented assembly language, to map the (disassembled) original agent to new return-oriented versions. A pseudo-assembly language was also used in Checkoway et al, to carry out an actual exploit of a voting machine. In that case, the gadgets were created by hand, though.

In contrast, in the present invention assembly gadgets are created automatically. Important in this step is how to pick useful instructions, and defining rules to chain these instructions together. Algorithms for automated gadget construction can be compared based on completeness, memory consumption and runtime overhead.

For example, a hierarchy of gadgets can be built as follows: First, define a list of registers to be used in the return oriented programs. Then, gradually create lists of basic gadgets, which perform similar tasks, for each working register. A simple one is # pop <register>; ret, which loads a constant into a register. Next, search for unitary operations, such as 'not' or 'neg'. After that, the algorithm searches for registers connected by binary operations, such as 'mov', 'add' and 'and', etc. It is possible to enhance the number of indirect binary operations found by conducting a small 'reachability analysis' in a directed graph where the nodes represent working registers and the edges represent binary operations directly connecting the two registers at their endpoints. Other useful basic gadgets for the x86 architecture are register-based memory load/operation gadgets, since most x86 instructions may take direct memory operands. In the next stage, higher-level gadgets such as addition, multiplication, bitwise-OR etc. are built by merging basic register-based gadgets into final unary/binary gadgets. Further higher-level control-flow altering gadgets, such as 'final comparison and dynamic control flow gadgets', will also be constructed.

Given the redundancy of the basic gadgets, it is possible to construct multiple different versions of the return-oriented assembly instructions, by using different, functionally equivalent gadgets in mapping the original assembly code. One way to quickly create different versions is by randomizing over equivalent gadgets, when multiple are available. Besides choosing gadgets at random to create agents, it is also possible to pick gadgets which are more likely to appear on a target machine, or to construct a 'custom build' agent, consisting of gadgets known to appear on a particular target machine.

Automated diversity (polymorphism and metamorphism) of executables has been created before by directly rewriting (functionally equivalent) assembly code. It is still possible to recognize such code as an executable, and to create a signature for it. The novelty of the current approach is that the automated diversity does not rely on injecting and/or sending actual (rewritten) assembly code. Return Oriented Programming has been used before but not for creating automated diversity.

Further, the prior art technique of automated diversity of executables by directly rewriting (functionally equivalent) assembly code can still be recognized as an executable and can have a signature created for it to enable a filter to block the code, for example using fast disassembly as in Chinchani et al. A novelty of the invention is that the automated diversity does not rely on injecting and/or sending actual (or rewritten) assembly code making existing recognition techniques, such as Chinchani et al ineffective.

In order to overcome the limitations of the prior art, in the present invention there is a method to create diverse (functionally and structurally diverse) yet equivalent copies of software executables. Generally, executables having broad diversity are not easily all recognized and/or blocked by signature-based pattern-matching engines. Furthermore, because the present method relies on return oriented programming the executables themselves are not easily recognized as such. This method can be used to protect updates (e.g. automatic agent-based updates) from being filtered.

That is, the present invention provides a method to create diverse yet equivalent copies of software executables, which are not easily recognized by existing signature-based pattern-matching engines.

Return-oriented programming has so far been used mainly for attack purposes, whereas in the present invention, it is also leveraged for benign and/or defensive purposes. Furthermore, the fact that multiple different versions of programs can be created automatically using this technique is an aspect of return oriented programming which has not been highlighted/discovered so far. Also, the novel use to create general program diversity is a non-obvious use of this technique in a different realm of transmitting benign code as contrasted with filtering or blocking malicious, unwanted code. The various forms of creating diversity identified here are also unique and non-obvious.

The advantages of the invention include: First: the return oriented program versions, when disseminated over a network, are harder to block by an adversarial pattern matching signature. Second: since each different return oriented program relies on a different combination of pieces of code inside the kernel, the population of program versions is more resilient as a whole against pattern detection techniques. Third: the number of dimensions made available to achieve diversity significantly increases the number of possible functionally equivalent programs that can be effectively generated (it is combinatorial large relative to the size of the code base and therefore effective for even small kernels). Finally, construction a 'custom built' return oriented program, for a particular target machine, is possible, e.g. a machine with a particular patch level or DLL installed. This is particularly practical if e.g. an image of the target machine is available.

The present invention will be more clearly understood when the following description is read in conjunction with the accompanying drawings.

BRIEF DESCRIPTION OF THE DRAWINGS

FIG. 1 is a block diagram illustrating an embodiment of the present invention.

DETAILED DESCRIPTION

Referring now to FIG. 1, given a program 100 and a target runtime environment 104, first create a Return Oriented Instruction Library 101 as a large collection of code fragments which end in a 'return' instruction. These code fragments are one or more instructions in length and are arranged efficiently in a trie data structure starting from each found 'return' instruction. The trie is filled by considering each valid 'return' ended fragment as a postfix for other possible valid instructions. Further valid instructions are found by working backwards from the first return ended instruction. The search process continues on different pieces of code inside the kernel, until sufficiently many (redundant) instruction sequences have been found.

The method for automated diversity can create and/or combine the following kinds of instruction diversity:

Location diversity, target fragment diversity, input diversity, and output diversity (diversifying the output stream with either non-functional ROP or non-functional regular instructions).

Location diversity is achieved through mapping selection 102 between equivalent target choices, i.e. exactly equivalent instructions in different locations in the Target Runtime Environment 104.

Target fragment diversity is achieved by selecting non-equivalent target fragments where the non-equivalent parts are non-functional (i.e. instructions in the non-equivalent parts do not have side effects or otherwise impact on the functional part being matched).

Input diversity is achieved by altering the input program 100 prior to applying any other diversity technique to a different yet functionally equivalent Return Oriented Program (i.e. inserting effective NOP's, recompilation, etc).

Output diversity is achieved by inserting non-functional program components (i.e. non-functional ROP sequences and/or non-functional target environment instructions).

Input and/or output diversity can be implemented in a separate Diversity Library, 105, and/or they can be implemented in a Return Oriented Executable Mapper 102. Target and location diversity can be implemented in a Return Oriented Instruction Library 101.

Next, the Return Oriented Executable Mapper 102, creates diverse return oriented program versions 103-1 through 103-N using any (combination of) diversity methods discussed above. As a specific example of location-diversity, the Return Oriented Executable Mapper 102 matches location-diverse code fragments in the Return Oriented Instruction Library 101 for each assembly level construct in the original program. One particular method for picking such a code fragment is to pick one at random, among the set of candidates. To create the various Return Oriented Program Versions 103-1 through 103-N, besides choosing equivalent fragments at random, it is also possible to choose those which are likely to be found on a larger number of target runtime environments 104, or to choose fragments appropriate for a 'custom build' for a particular Target Runtime Environment 104.

Various aspects of the present disclosure may be embodied as a program, software, or computer instructions embodied in a computer or machine usable or readable device, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as handheld, desktop, laptop, and/or server. A module may be a component of a device, software, program, or system that implements some "functionality", which can be embodied as software, hardware, firmware, electronic circuitry, or the like.

While there has been described and illustrated method of automatically creating functionally and structurally diverse equivalent copies of software executables using return oriented programming, it will be apparent to those skilled in the art that variations and modifications are possible without deviating from the broad teachings.

What is claimed is:

1. A method for automatically creating functional and structural diverse equivalent copies of software executables using return oriented programming comprising:
    starting with an input binary program in executable code and a target run-time environment;
    creating a return oriented instruction library having a plurality of code fragments which end in a 'return' instruction from the run-time environment; and
    upon evaluation of the input binary executable program automatically selecting program equivalent fragments from the return oriented instruction library and chaining these fragments together to form diverse equivalent copies of software executables using return oriented programming producing output binary programs for the same target run-time environment, each output binary program being capable of performing the functions of the input binary program and differing from the input binary executable program in terms of representation and execution.

2. A method as set forth in claim 1, wherein the code fragments comprise one or more instructions in length and are arranged efficiently in a trie data structure starting from each found 'return' instruction where the trie is filled by considering each valid 'return' ended fragment as a postfix for other possible valid instructions.

3. A method as set forth in claim 1, wherein the automated diversity is target fragment diversity achieved by selecting non-equivalent target fragments where the non-equivalent parts are non-functional with respect to the original binary executable program.

4. A method as set forth in claim 3, wherein the target diversity is implemented in a return oriented instruction library.

5. A method as set forth in claim 1, wherein the automated diversity is input diversity achieved by altering an input binary executable program prior to applying any other diversity technique to yield a different yet functionally equivalent Return Oriented Program.

6. A method as set forth in claim 5, wherein the input diversity is implemented in a separate diversity library.

7. A method as set forth in claim 5, wherein the input diversity is implemented in a return oriented executable mapper.

8. A method as set forth in claim 1, wherein the automated diversity is output diversity achieved by inserting non-functional program components comprising at least one of non-functional return oriented programming sequences and non-functional target environment instructions.

9. A method as set forth in claim 8, wherein the output diversity is implemented in a separate diversity library.

10. A method as set forth in claim 8, wherein the output diversity is implemented in a return oriented executable mapper.

11. A method as set forth in claim 1, wherein the automated diversity is location diversity achieved through mapping selection between equivalent target choices.

12. A method as set forth in claim 11, wherein the location diversity is achieved through equivalent instructions in different locations in a Target Runtime Environment.

13. A method as set forth in claim 11, wherein the location diversity is implemented in a return oriented instruction library.

14. A computer usable non-transitory medium having computer readable program code for automatically creating functional and structural diverse equivalent copies of software executables using return oriented programming comprising:
   starting with an input binary program in executable code and a target run-time environment;
   creating a return oriented instruction library having a plurality of code fragments which end in a 'return' instruction from the run-time environment; and
   upon evaluation of the input binary executable program automatically selecting program equivalent fragments from the return oriented instruction library and chaining these fragments together to form diverse equivalent copies of software executables using return oriented programming producing output binary programs for the same target run-time environment, each output binary program being capable of performing the functions of the input binary program and differing from the input binary executable program in terms of representation and execution.

15. A computer usable non-transitory medium as set forth in claim 14, wherein the code fragments comprise one or more instructions in length and are arranged efficiently in a trie data structure starting from each found 'return' instruction where the trie is filled by considering each valid 'return' ended fragment as a postfix for other possible valid instructions.

16. A computer usable non-transitory medium as set forth in claim 14, wherein the automated diversity is target fragment diversity achieved by selecting non-equivalent target fragments where the non-equivalent parts are non-functional with respect to the original binary executable program.

17. A computer usable non-transitory medium as set forth in claim 16, wherein the target diversity is implemented in a return oriented instruction library.

18. A computer usable non-transitory medium as set forth in claim 14, wherein the automated diversity is input diversity achieved by altering an input binary executable program prior to applying any other diversity technique to yield a different yet functionally equivalent Return Oriented Program.

19. A computer usable non-transitory medium as set forth in claim 18, wherein the input diversity is implemented in a separate diversity library.

20. A computer usable non-transitory medium as set forth in claim 18, wherein the input diversity is implemented in a return oriented executable mapper.

21. A computer usable non-transitory medium as set forth in claim 14, wherein the automated diversity is output diversity achieved by inserting non-functional program components comprising at least one of non-functional return oriented programming sequences and non-functional target environment instructions.

22. A computer usable non-transitory medium as set forth in claim 21, wherein the output diversity is implemented in a separate diversity library.

23. A computer usable non-transitory medium as set forth in claim 21, wherein the output diversity is implemented in a return oriented executable mapper.

24. A computer usable non-transitory medium as set forth in claim 14, wherein the automated diversity is location diversity achieved through mapping selection between equivalent target choices.

25. A computer usable non-transitory medium as set forth in claim 24, wherein the location diversity is achieved through equivalent instructions in different locations in a Target Runtime Environment.

26. A computer usable non-transitory medium as set forth in claim 24, wherein the location diversity is implemented in a return oriented instruction library.

* * * * *

UNITED STATES PATENT AND TRADEMARK OFFICE
CERTIFICATE OF CORRECTION

PATENT NO.         : 8,689,201 B2                                              Page 1 of 1
APPLICATION NO.    : 13/014788
DATED              : April 1, 2014
INVENTOR(S)        : van den Berg et al.

It is certified that error appears in the above-identified patent and that said Letters Patent is hereby corrected as shown below:

Title Page, in Item (75), under "Inventors", in Column 1, Line 2, delete "W" and insert -- W. --, therefor.

Title Page, in Item (56), under "OTHER PUBLICATIONS", in Column 2, Line 13, delete ""In review" and insert -- published in "In review --, therefor.

Title Page, in Item (56), under "OTHER PUBLICATIONS", in Column 2, Lines 15-17, delete "R. Roemer, E. Buchanan, H. Shacham and S. Savage, "Return-Oriented Programming: Systems, Languages, and Applications", In review, Oct. 2009.".

Signed and Sealed this
Twenty-fifth Day of November, 2014

Michelle K. Lee
*Deputy Director of the United States Patent and Trademark Office*